United States Patent Office.

ABRAM WESTBROOK AND JUSTIN CAMPBELL, OF LEONA, PENNSYLVANIA.

Letters Patent No. 66,432, dated July 2, 1867.

IMPROVED COMPOSITION FOR TANNING.

*The Schedule referred to in these Letters Patent and making part of the same.*

TO ALL WHOM IT MAY CONCERN:

Be it known that we, ABRAM WESTBROOK and JUSTIN CAMPBELL, of Leona, in the county of Bradford, and State of Pennsylvania, have invented a new and improved Composition for Tanning Leather; and we do hereby declare that the following is a full, clear, and exact description thereof, which will enable others skilled in the art to fully understand and make use of the same.

This invention relates to a composition for tanning fur skins and glove leather, by the application of which the process of tanning will be facilitated and hastened, and whereby the leather will be made more tough, softer, and more pliable than it can be made with the methods now in use, and whereby stretching and working while drying the leather are unnecessary, thus saving a great amount of labor, besides producing a superior article.

The composition consists of the following ingredients, which are compounded in about the following proportions: To ten gallons of soft warm water are added one-half pound of starch, one pound of extract of licorice, and seven pounds of salt. The whole is well stirred until the salt is well dissolved, and then two and one-half pounds of sulphuric acid are added, the whole mixture being continually stirred while the acid is being slowly poured in.

The licorice renders the acid less ardent or fiery, and acts as a demulcent in softening and toughening the leather, which thereby requires less pulling and stretching while being dried.

What we claim as new, and desire to secure by Letters Patent, is—

1. The application of licorice for tanning purposes, for the purpose set forth.
2. The composition for tanning leather, when the same is compounded of the ingredients in about the proportions set forth.

ABRAM WESTBROOK,
JUSTIN CAMPBELL.

Witnesses:
JOHN JORALEMON,
O. P. ADAMS.